(12) United States Patent
Bigo et al.

(10) Patent No.: US 6,176,507 B1
(45) Date of Patent: Jan. 23, 2001

(54) CHILD'S PUSH-CHAIR FOR A TELESCOPIC EXTENDABLE CRADLE, AND THE CORRESPONDING CRADLE

(75) Inventors: Jean Bigo; Laurent Ageneau, both of Cholet (FR)

(73) Assignee: Ampafrance, Cholet (FR)

( * ) Notice: Under 35 U.S.C. 154(b), the term of this patent shall be extended for 0 days.

(21) Appl. No.: 09/233,635

(22) Filed: Jan. 19, 1999

(30) Foreign Application Priority Data

Jan. 21, 1998 (FR) .................................................. 98 00820

(51) Int. Cl.[7] ........................................................ B62B 7/00
(52) U.S. Cl. ............................ 280/647; 280/30; 280/650; 280/658; 297/284.3
(58) Field of Search ............................... 280/40, 642, 647, 280/649, 650, 651, 657, 658, 47.38, 47.41, 30; 297/284.1, 284.3

(56) References Cited

U.S. PATENT DOCUMENTS

| 1,917,557 | * | 7/1933 | Steiger ................................. 280/647 |
| 4,542,915 | * | 9/1985 | Wheeler, III et al. ............... 280/655 |

FOREIGN PATENT DOCUMENTS

| 825 298 | 5/1975 | (BE) . |
| 1 462 381 | 2/1967 | (FR) . |
| 2 617 110 | 12/1988 | (FR) . |

* cited by examiner

*Primary Examiner*—Richard M. Camby
(74) *Attorney, Agent, or Firm*—Merchant & Gould P.C.

(57) ABSTRACT

A child's push-chair for telescopic extendable cradle, and the corresponding cradle.

Figure 1:
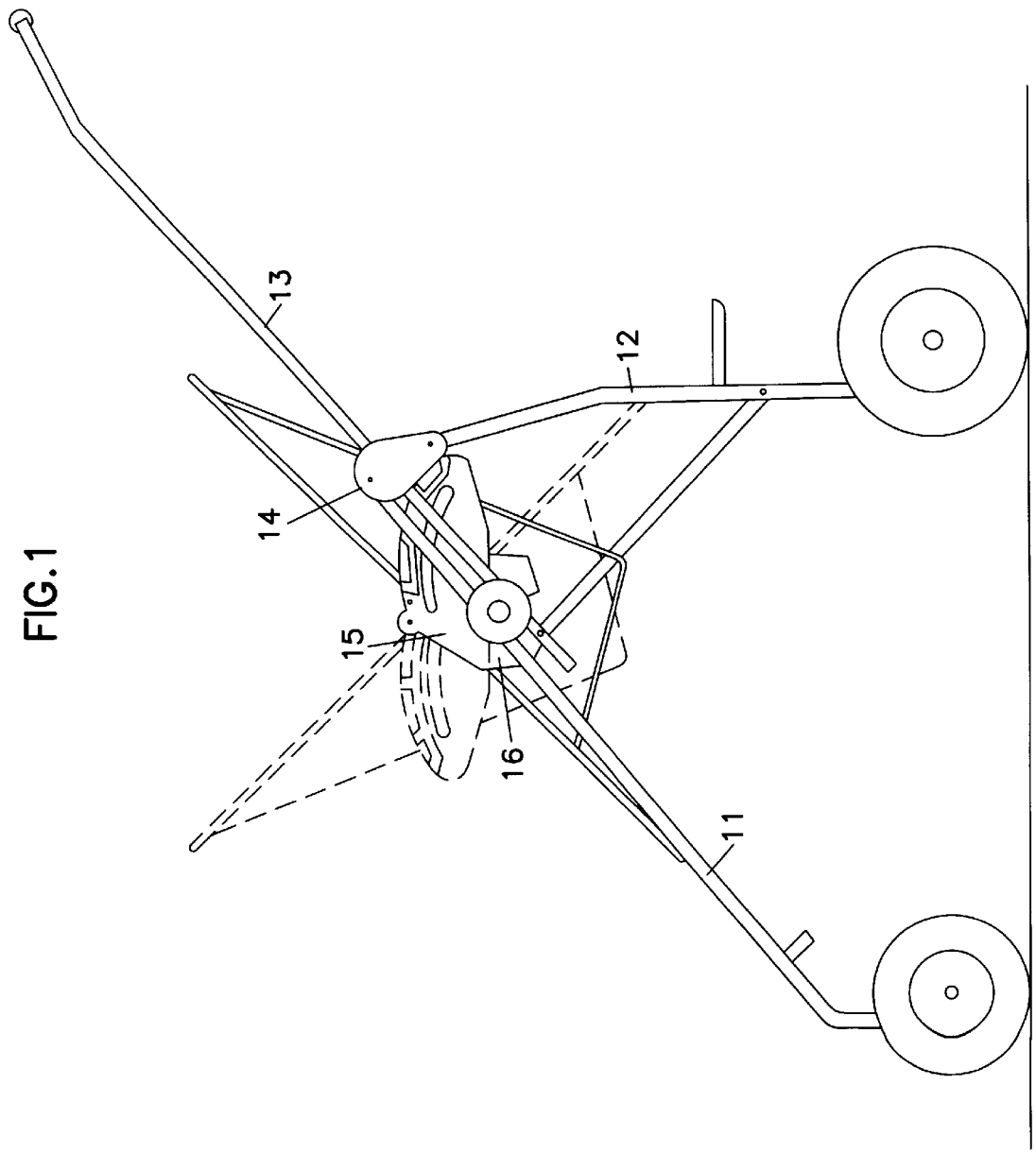

The invention concerns a child's push-chair of a type consisting of an inclinable cradle mounted on a push-chair chassis, with the cradle consisting of a support element (22, 25) supporting a seat, the said support being formed of two parts, an upper part (25) and a lower part (22), where the said upper part 25) is able to slide in relation to the lower part (22) in such a manner that the maximum length of the said support element is able to vary between two extremes in order to allow the sitting angle of the seat to vary.

According to the invention, the cradle includes, on each of its sides, a guidance part (15) attached to one of the said parts of the support element (22) and having an oblong slot (23) in which a guidance lug (24), attached to the other part of the support element (25) is able to move, the movement of the said guidance lug (24) in the said slot (23) enabling the said length of the support element and the slope of the said cradle, to be controlled.

10 Claims, 3 Drawing Sheets

CHILD'S PUSH-CHAIR FOR A TELESCOPIC EXTENDABLE CRADLE, AND THE CORRESPONDING CRADLE

The area of the invention is that of child-rearing, and in particular that of children's push-chairs. More exactly, the invention concerns a child's push-chair on which the cradle can be inclined, and presents a sitting angle which varies in accordance with its slope.

One is already familiar with many push-chairs for inclining cradles or cots. Conventionally, the cradle is mounted on the chassis of the push-chair. A variety of means are provided on the chassis in order to guide and install the cradle, and to hold it in the desired position.

One known improvement is to cause the cradle position angle to vary in accordance with its slope. Thus when the cradle is in a more-or-less level position (the sitting position), the sitting angle (that is the angle formed by the seat element and the back element of the cradle) is of the order of 110°, so as to form a chair with a back. Conversely, when the cradle is in the extended or lying position, the angle formed by the seat of the cradle opens out considerably (of the order of 160°). In this position, the child is seated comfortably when the cradle is in the chair position, and is lying when the cradle is in the extended position. Intermediate positions can also be achieved of course.

In order to achieve this result, the cradle, viewed from the side, presents a variable triangular structure. The hypotenuse of this triangle is formed by the support element of the cradle. The other two sides (the seat part and the back part) are two stiffening elements (conventionally these are sheets of a plastic material) which are jointed at their common edge. The support element is designed so that its length can vary. The variations in this length result in the automatic opening or closure of the angle formed by the seat part and the back part of the cradle.

To be more precise, in the sitting or chair position, the support element is at its minimum length, and in the lying or extended position, the support element is at its maximum length. To achieve this, the support element is designed in two parts, an upper part and a lower part, the upper part being capable of penetrating telescopically into a portion of the lower part.

Maintenance of the cradle at a given slope, and with the desired opening of the sitting angle, is achieved by means of a set of push-rods which are attached to the chassis of the push-chair. This mechanism is relatively complex, both in respect of its assembly during manufacture of the push-chair and also in use. This proves not to be very practical in the case where the cradle is designed to be used alternatively in the sitting position when facing the road or in the sitting position when facing the mother. In such a case in fact, it is necessary first to manipulate the chassis in order to set the push-rods in the required position, and then to turn the cradle, after first detaching it from the chassis, and finally re-fitting it in the desired position.

More generally, the known systems have many such disadvantages, in respect of both their manufacture:
  a large number of moving parts,
  a significant assembly time, and of their use difficult to operate,
  problems with reversible cradles, in achieving a position facing the road or the mother,
  safety problems:
  the fact that the child is able to interfere with the slope controls.

The main objective of the invention is to get round these various disadvantages of the current techniques.

More precisely, one of the first objectives of the invention is to provide a child's push-chair with an inclinable cradle and a variable sitting angle, which will also be easy to use in relation to the known techniques.

A particular aim of the invention is to supply such a push-chair, in which the cradle can be detached from the chassis with ease and then re-attached to the chassis likewise.

Another objective if the invention is to provide such a push-chair in which the cradle can be placed in the desired position in a simple and reliable manner, preferably by a person standing behind the push-chair, and so that the child will be unable to interfere with this position.

In one particular production method, a further objective of the invention is to provide such a push-chair in which the cradle is reversible, with no difficult or complex operations.

Yet another objective of the invention is to provide such a push-chair where the costs of production are reduced in relation to conventional push-chairs of the same type. More exactly, the purpose of the invention is to provide such a push-chair where both the manufacturing costs and the assembly costs are reduced. A particular goal of the invention is to provide such a push-chair where the slope and the control of the sitting angle are achieved using a smaller number of parts.

Another particular objective of the invention is to provide such a push-chair which facilitates the use of optional fittings attach to the cradle.

The invention concerns a child's push-chair of a type consisting of an inclinable cradle mounted on a push-chair chassis, with the cradle consisting of a support element supporting a seat, the support being formed of two parts, an upper part and a lower part, where the said upper part is able to slide in relation to the lower part in such a manner that the maximum length of the support is able to vary between two extremes in order to allow the sitting angle of the seat to be vary.

The above objectives, and others which will appear later, are achieved by this invention by the use of a cradle which consists of a guidance element on each side which is attached to one of the said parts of the support, this element having an oblong slot in which a guidance lug, attached to the other part, can move, the movement of the said guidance lug in the said oblong slot being used to control the said length of the support element and the inclination of the said cradle.

Thus the parts used to establish and control the positioning and opening of the sitting angle are attached to the cradle only, and are therefore independent of the chassis. The guidance part is a single block, and can be manufactured and mounted on the cradle without difficulty. The production costs are therefore lower in relation to the known techniques.

In an advantageous manner, the said oblong slot presents a profile close to the arc of a circle. This shape enables an opening of the sitting angle to be achieved which is proportional to the slope of the cradle.

According to one particular method of manufacture of the invention, the said guidance lug is attached to the said upper part. The production method is described in greater detail below. However, there is nothing to prevent the roles of the upper and lower parts from being reversed.

With advantage, each of the said guidance parts has at least two stop notches, which fit together with a stop lug attached to the part of the said support element bearing the guidance lug, each of these stop notches corresponding to a stable slope of the said cradle.

Various other methods of locking the device at the desired slope position can be envisaged of course. As an example, one can contemplate locking in position by tightening the guidance stud in the said slot.

According to a preferred method of manufacture of the invention, the said stop lugs are released by the operation of a single control element, with return components returning the said lugs automatically into the locked position. Of course it is also possible to arrange for two distinct control elements, each associated with one of the said guidance parts.

To the advantage of the invention, when a single control element is used, this follows the said upper part of the support fairly closely, and has an operating handle on its horizontal part.

Thus it is possible to incline the cradle with one hand only while remaining behind the push-chair, facing the push-handle of the push-chair.

With further advantage, the said guidance parts fit together with the means by which the said cradle is attached to the said chassis. In this way, it is easy to install and combine or separate the cradle and the chassis, with no necessity for any external devices.

In a manner which is preferred, the said cradle can be mounted in both directions on the said chassis, in a manner which offers one position facing the road and a second facing the mother. For example, this could be a cradle of the type described in patent FR-96 11035, in the name of the same applicant as this present application. It is thus easy to change from one mode to the other, by separating the cradle from the chassis and re-positioning it. No other operation is necessary.

According to an advantageous method of manufacture of the invention, the said guidance parts include the means of attaching at least one optional fitting, such as a retaining arch, a sun-shade, a canopy, etc.

The invention also concerns a cradle such as that described above.

Figure 2:
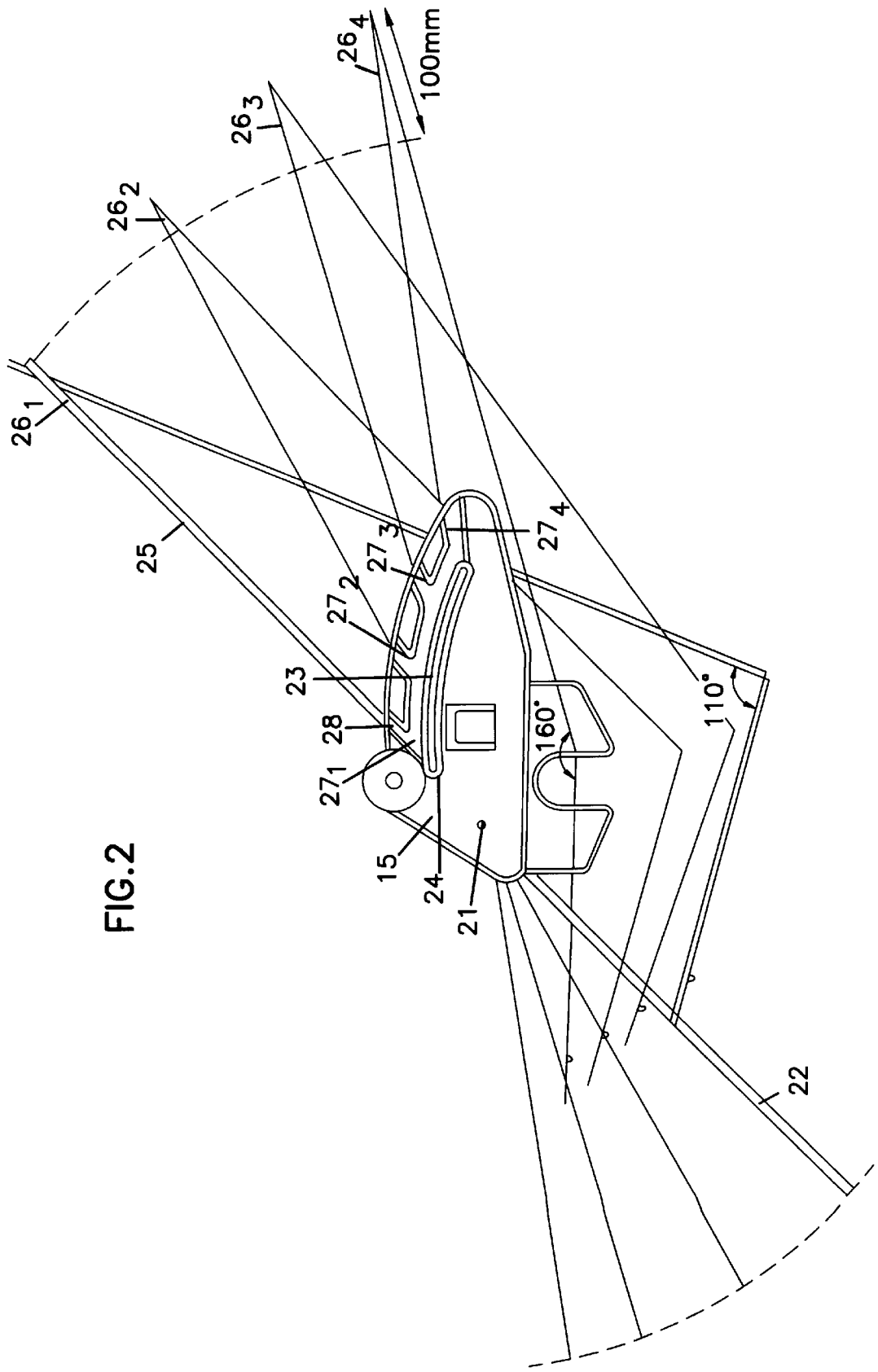

Other characteristics and advantages of the invention will be discovered on reading the following description of a preferred method of manufacture of the invention, given as a simple illustrative though not limited example, and on studying the attached drawings, which include:

FIG. 1, which shows a side view of the push-chair of the invention,

FIG. 2, illustrating the four stable positions which the cradle can assume on the push-chair of FIG. 1.

Figure 3:
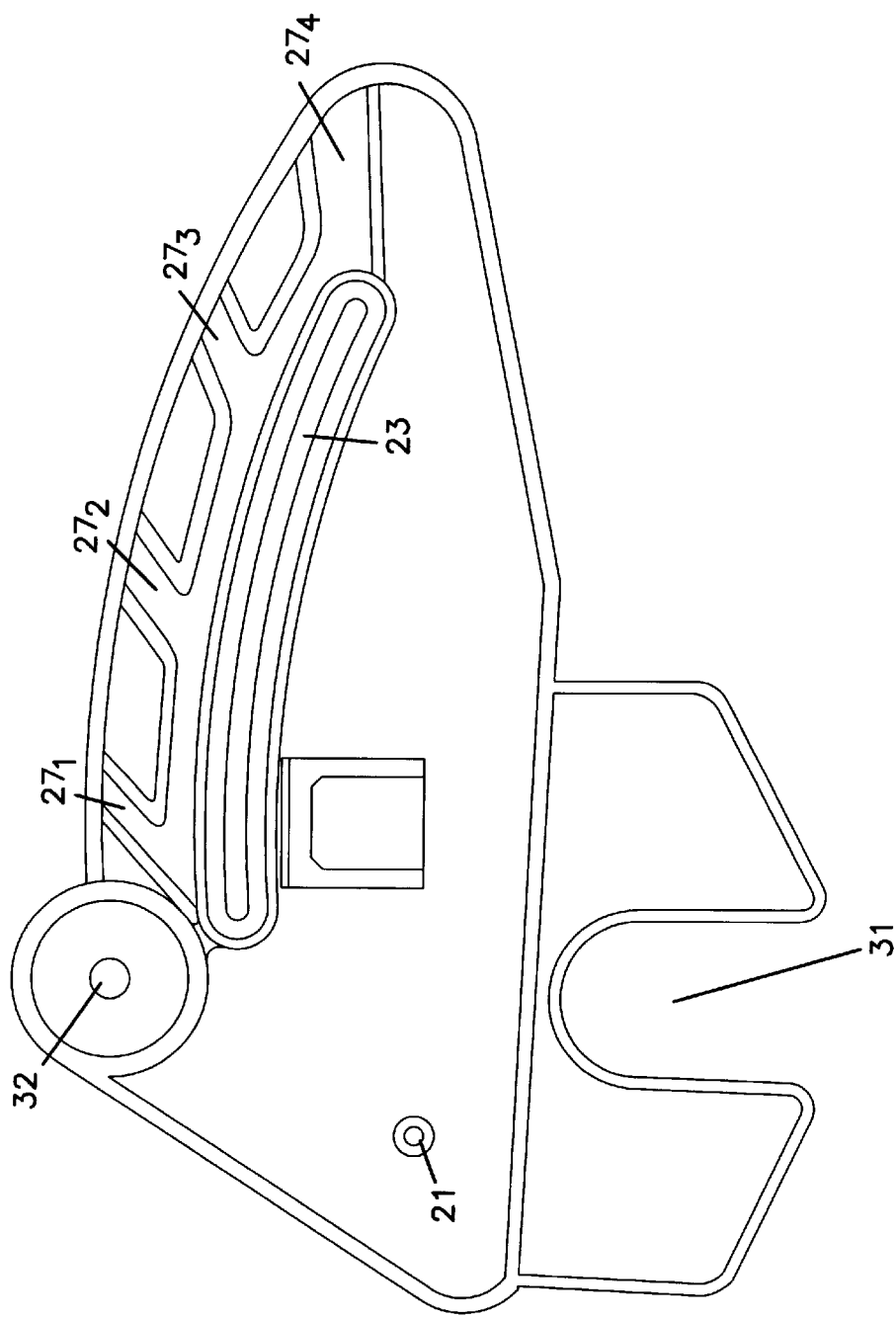

FIG. 3, giving a side view of the guidance element fitted to the cradle of FIG. 2.

As mentioned above, the invention therefore concerns a push-chair with inclinable cradle, in which the angle formed by the seat is variable in accordance with its slope. According to the invention, control of the slope and of the amplitude of the seat angle is catered for by a single part on each side of the cradle, this being totally independent of the chassis. In other words, no moving parts attached to the chassis are necessary to provide these functions. The two guidance elements are mounted on and permanently fixed to the chassis.

Such a push-chair is shown in FIG. 1. Conventionally, the chassis has a front support element (11), a rear support element (12), and a push-handle (13). The cradle (14) (shown without its fabric and padding parts, in order to simplify the comprehension of the drawing), is secured to the chassis by means of guidance parts (14). A locking system, which works by fitting into a receiving element (13) attached to the chassis, is used to secure the guidance part (15) to the chassis.

As illustrated by dashed lines, the cradle is reversible. To do this, it is necessary only to release the guidance parts from the chassis, to reverse the cradle, and to re-position the guidance parts.

FIG. 2 illustrates the cradle of FIG. 1. The guidance part (15) has a fixing point (21) on the lower part (22) of the cradle support, about which the latter is able to pivot. This part also has an oblong slot (23) in which the guidance lug (24) can move, the latter being mounted on the upper part (15) of the support.

Between points (21) and (24), the upper part of the support can slide inside the lower part (22) of the support, so that the distance between points (21) and (24) can vary. Thus between the sitting position ($26_1$) and the lying position ($26_4$), this distance can vary by the length of the slot. This results in an identical extension (some 100 mm for example) of the total length of the support in the lying position ($26_4$), and to a considerable opening out (to some 160°) of the cradle seat.

At least one intermediate position, ($26_2$), ($26_3$), can be provided with advantage.

Control of this extension is provided for by the slot (23). Securing in one of the positions between ($26_1$) and $26_4$) can be achieved by a system of stop notches, ($27_1$) to ($27_4$). These notches are created in the guidance part (15). A stop lug (28) is provided in the upper part (25) of the support.

Return devices (not shown) hold this stop lug (28) in position in one of the stop notches ($27_1$) to ($27_4$) so that the cradle in retained in the desired position, between ($26_1$) and ($26_4$). To change this position, control devices (not shown) are provided to release the stop lugs from the stop notches on each side of the cradle. When the cradle is in its new position, it is necessary only to release these control devices for the stop lugs to be returned into their corresponding stop notches.

Of course it is possible to provide a separate control for each guidance part. However according to a preferred method of production, a single control is provided, and this allows both lugs to be controlled simultaneously. In particular, this operates a rod connecting the two lugs, across the rear of the cradle.

In an advantageous manner this rod is pre-shaped so that it closely follows the upper part (25) of the support, and has a handle in the region of the upper part of the cradle. To change the position of the cradle then, it is necessary only to operated this handle by a single press. Operation is therefore particularly easy since the person using the push-chair remains behind is in the normal pushing (or pulling) position, and is able to operate the control with one hand, to place the cradle in the desired position.

FIG. 3 provides a detailed view of one guidance part of the invention. It can be see easily that this is a simple part, which is inexpensive to produce, and can be created by moulding in a suitable plastic materiel, for example.

In addition to the oblong slot (23) and the stop notched ($27_1$) to ($27_4$) mentioned previously, the retaining notch (31) can also be seen on this part. This is designed to fit together with a corresponding reception and securing element on the chassis of the push-chair.

An element (32) to take the means of attaching a retaining arch is also provided. In like manner, other devices can be provided to take various optional fittings. These are therefore attached to the cradle and not to the chassis, and so are always in the correct position, whatever the slope of the cradle.

The method of manufacture of the invention described above is not limiting of course. On the contrary, many adaptations can be envisaged. As an example, the profile of the oblong slot can be altered, the direction of the stop notches can be reversed (so that operation of the unlocking handle would then be upward instead of downward), and the roles of the upper and lower parts of the support element can be reversed.

What is claimed is:

1. A push-chair comprising an inclinable cradle mounted on a push-chair chassis, the cradle being detachable from the chassis and having a support element supporting a seat, the support element being formed of an upper part and a lower part, the upper part being capable of sliding in relation to the lower part so that the length of the support element can be varied whereby a sitting angle of the seat varies, the cradle defining a variable triangular structure wherein the support element forms a hypotenuse thereof and the seat forms two other sides thereof, wherein the cradle includes, on opposite sides, a guidance part attached to one of the upper and lower parts of the support element at a fixing point, whereby the one of the upper and lower parts of the support element is able to pivot about the fixing point, and the guidance part having an oblong slot in which a guidance lug attached to the other of the upper and lower parts of the support element is able to move, the movement of the guidance lug in the slot enabling the length of the support element and the sitting angle of the cradle, to be controlled.

2. A push-chair in accordance with claim 1, wherein the oblong slot has a profile resembling the arc of a circle.

3. A push-chair in accordance with claim 1, wherein the guidance lug is attached to the upper part of the support element.

4. A push-chair in accordance with claim 1, wherein each of the guidance parts includes at least two stop notches which fit together with a stop lug attached to the one of the upper and lower parts of the support element having the guidance lug, each of the stop notches corresponding to a stable sitting angle of the cradle.

5. A push-chair in accordance with claim 4, wherein the stop lugs are released by the operation of a single control device, with return components returning the stop lugs automatically into a locked position.

6. A push-chair in accordance with claim 5, wherein the single control device closely follows the one of the upper and lower parts of the support element, and also has an operating handle on a horizontal part.

7. A push-chair in accordance with claim 1, wherein the guidance parts fit together with means for fixing the cradle (14) to the chassis.

8. A push-chair in accordance with claim 1, wherein the cradle can be mounted on the chassis first position facing away from a person pushing the push-chair, and a second position facing towards a person pushing the push-chair.

9. A push-chair in accordance with claim 1, wherein the guidance parts include means for attaching at least one optional fitting thereto.

10. An inclinable cradle mounted on a push-chair chassis, the cradle being detachable from the chassis, the cradle having a support element supporting a seat, wherein the support element is formed of an upper part and a lower part, the upper part being able to slide in relation to the lower part so that the length of the support element can be varied whereby the sitting angle of the seat varies, the cradle defining a variable triangular structure wherein the support element forms a hypotenuse thereof and the seat forms two other sides thereof, wherein the cradle includes, on opposite sides, a guidance part attached to one of the upper and lower parts of the support element at a fixing point, whereby the one of the upper and lower parts of the support element is able to pivot about the fixing point, and the guidance part having an oblong slot in which a guidance lug attached to the other of the upper and lower parts of the support element is able to move, the movement of the guidance lug in the slot enabling the length of the support element and the sitting angle of the cradle, to be controlled.

* * * * *